(12) United States Patent
Hagerott et al.

(10) Patent No.: US 11,733,714 B2
(45) Date of Patent: Aug. 22, 2023

(54) INTELLIGENT AIRCRAFT AND ROTORCRAFT LOAD FACTOR AND STALL PROTECTION

(71) Applicant: Bell Textron Inc., Fort Worth, TX (US)

(72) Inventors: Steven G. Hagerott, Wichita, KS (US); Jonathan Andrew Toth, Irving, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 224 days.

(21) Appl. No.: 17/149,445

(22) Filed: Jan. 14, 2021

(65) Prior Publication Data

US 2022/0221878 A1    Jul. 14, 2022

(51) Int. Cl.
*G05D 1/08*   (2006.01)
*B64C 29/00*  (2006.01)
*G05D 1/00*   (2006.01)
*B64C 13/50*  (2006.01)

(52) U.S. Cl.
CPC ....... *G05D 1/0808* (2013.01); *B64C 29/0033* (2013.01); *G05D 1/0055* (2013.01); *B64C 13/503* (2013.01)

(58) Field of Classification Search
CPC ............... G05D 1/0808; G05D 1/0055; B64C 29/0033; B64C 13/503
See application file for complete search history.

(56) References Cited

U.S. PATENT DOCUMENTS 4,035,705 A * 7/1977 Miller ................. G05D 1/0077
318/566
4,849,900 A * 7/1989 Blight ................. G05D 1/0061
244/180
2019/0256200 A1* 8/2019 Neff ........................ B64D 27/24
(Continued)

FOREIGN PATENT DOCUMENTS

CN    108536020 B  *  6/2019  .......... G05B 13/042
EP    0083569 A1   *  7/1983
JP    2018132234 A *  8/2018

OTHER PUBLICATIONS

English translation of CN-108536020-B.*
(Continued)

*Primary Examiner* — Anshul Sood
*Assistant Examiner* — Matthew Ho
(74) *Attorney, Agent, or Firm* — Akona IP

(57) ABSTRACT

There is disclosed in one example an inner loop controller for an aircraft flight computer, including: a stall protection circuit to compute, for an attitude angle θ, an attitude limit $\theta_{max}$ as a function of a flight path angle (γ) and an angle of attack limit ($\alpha_{max}$); a transfer function circuit to convert θ to an attitude rate $\dot{\theta}$, wherein $\dot{\theta}$ is a time derivative of θ; and a load protector circuit to compute a limit on $\dot{\theta}$ ($\dot{\theta}_{max}$) as a function of a load factor limit ($N_{z,max}$) and a true airspeed (v).

15 Claims, 8 Drawing Sheets

(56) References Cited

U.S. PATENT DOCUMENTS

2021/0206476 A1* 7/2021 Shin ................. B64C 13/16

OTHER PUBLICATIONS

English translation of JP-2018132234-A.*
Buckner, J. K., J. E. Walker, and C. K. Clark, "The design of the F-16 High-Alpha Flight Control Characteristics and Control System Concept," AIAA 17th Aerospace Sciences Meeting, New Orleans, LA, Jan. 15-17, 1979; 9 pages; https://arc.aiaa.org/doi/abs/10.2514/6.1979-403.
Eduardo Alves Menini and Gilberto Meira Cardoso, "Embraer 170/190—A Team Effort in Designing and Testing the Angle of Attack Limiting System," © 2004, 16 pages.
Falkena, Wouter, et al., "Investigation of Practical Flight Envelope Protection Systems for Small Aircraft," Journal of Guidance, Control, and Dynamics vol. 34, No. 4 Jul.-Aug. 2011, 13 pages; https://arc.aiaa.org/doi/abs/10.2514/1.53000?journalCode=jgcd.
Iloputaife, "Design of Deep Stall Protection for the C-17A," Journal of Guidance, Control, and Dynamics, vol. 20, No. 4, Jul.-Aug. 1997, 8 pages; https://arc.aiaa.org/doi/abs/10.2514/2.4109?journalCode=jgcd.
Oudin et al., "Low Speed Protections for a Commercial Airliner: a Practical Approach," AIAA SciTech Forum, AIAA Guidance, Navigation, and Control Conference Jan. 9-13, 2017, Grapevine, Texas, 9 pages; https://arc.aiaa.org/doi/10.2514/6.2017-1023.

* cited by examiner

INTELLIGENT AIRCRAFT AND ROTORCRAFT LOAD FACTOR AND STALL PROTECTION

TECHNICAL FIELD

This disclosure relates generally to aircraft devices and, more particularly, to a system and method of providing intelligent aircraft and rotorcraft load factor and stall protection.

BACKGROUND

Aircraft have mechanical limits based on their construction and material properties. One of these limits is known as a "load factor limit," called $N_z$, and generally has units of "g's"

$$\left(\text{where one } g \text{ is } \sim 9.8\ \frac{m}{s^2}\ \text{or}\ \sim 32.2\frac{\text{ft}}{s^2}\right).$$

SUMMARY

In an example, there is disclosed an inner loop controller for an aircraft flight computer, comprising: a stall protection circuit to compute, for an attitude angle $\theta$, an attitude limit $\theta_{max}$ as a function of a flight path angle ($\gamma$) and an angle of attack limit ($\alpha_{max}$); a transfer function circuit to convert $\theta$ to an attitude rate $\dot{\theta}$, wherein $\dot{\theta}$ is a time derivative of $\theta$; and a load protector circuit to compute a limit on $\dot{\theta}$ ($\dot{\theta}_{max}$) as a function of a load factor limit ($N_{z,max}$) and a true airspeed ($v$).

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
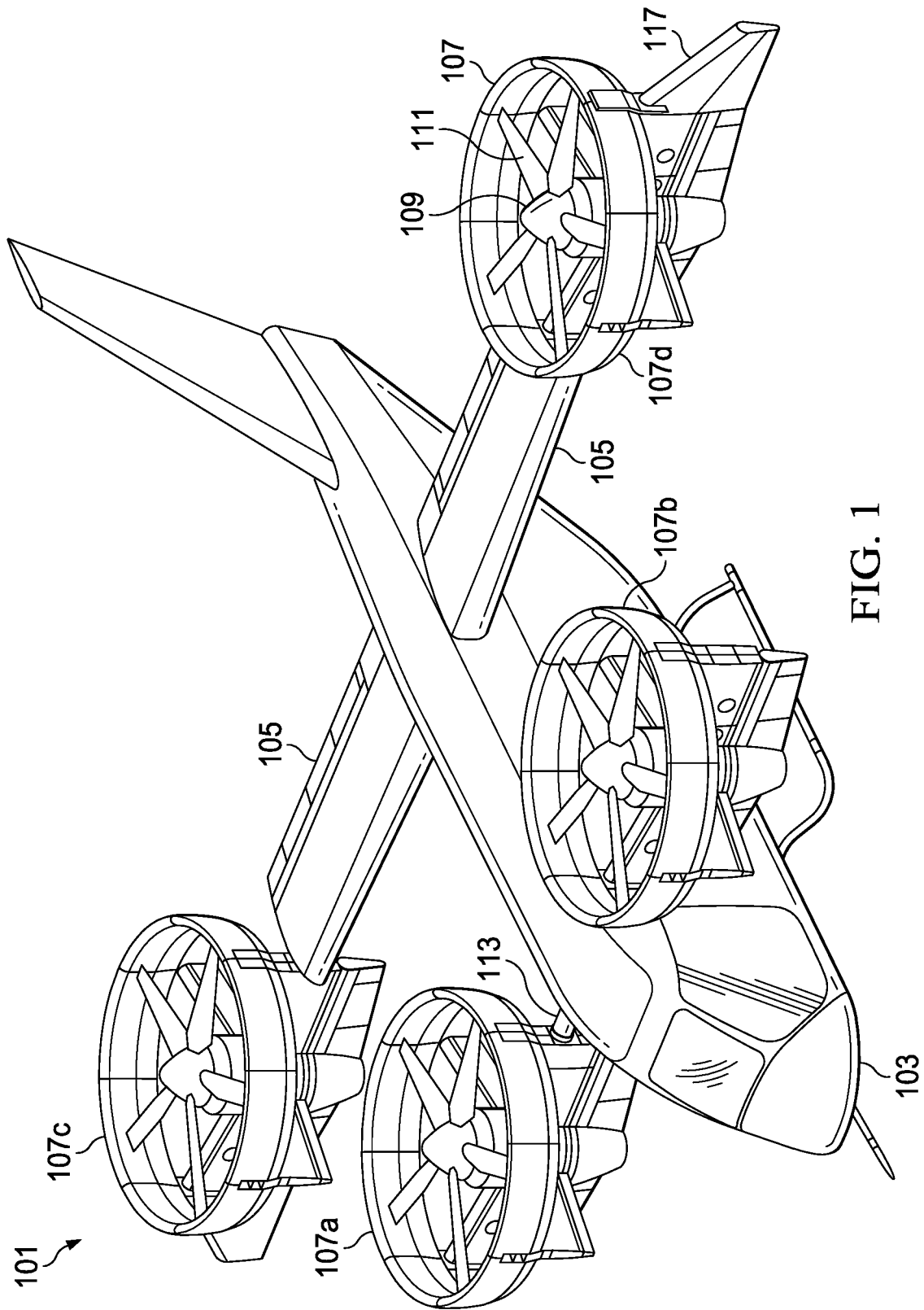
FIG. 1 is an oblique view of an aircraft with ducted rotors, with the ducted rotors configured for the aircraft to operate in a helicopter mode.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In this disclosure, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "top," "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein, the terms "forward," "aft," "inboard," and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of-an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Throughout this specification, several variables may be used to describe certain aircraft parameters. These include, by way of illustrative example:

g—Acceleration due to gravity. At sea level, this is approximately $$9.8 \frac{m}{s^2}, \text{ or } 32.2 \frac{\text{ft}}{s^2}.$$

q—Pitch rate (radians per second).
v—True airspeed, scalar (in meters per second or feet per second).
γ—Flight path angle.
r—Body yaw rate (radians per second).
$N_{z,max}$—Maximum vertical acceleration in g units.
φ—Roll attitude (aka, bank angle).
α—Angle of attack (degrees).
$\dot{\alpha}$—Angle of attack rate (degree per second).
θ—Pitch attitude angle (degree).
$\theta_{max}$—θ limit (degrees).
$\alpha_{max}$—Maximum allowable angle of attack.
k—Turning parameter to add anticipation to limiting.

Traditional first-generation aircraft had control surfaces that were directly controlled by pilot inputs. A pilot control stick, yoke, collective, pedals, or other controls would be connected to flight surfaces via cables or hydraulics, and a mechanical transfer function would translate the pilot's movements into movement on the control surfaces. Some older or inexpensive aircraft still use such a system. However, more modern or high-end aircraft include so-called fly-by-wire systems. These fly-by-wire systems do not directly mechanically couple pilot inputs to the control surfaces, but rather electronically sense the pilot's operation or displacement of controls, and then electronically translate those into movement on the control surfaces.

In an illustrative example, a pilot has a stick or a yoke that includes an input for pitch attitude. Displacement of this controller may be electronically sensed, and then provided as a pilot input to a flight control computer. The flight control computer can provide an electronically augmented flight control, an autonomous or semiautonomous flight control, an autopilot feature for a pilot-controlled aircraft, or a fully autonomous mode such as in a drone.

The flight control computer may provide a second order transfer function with an outer loop that commands the pitch attitude, and an inner loop of a model follower control law (CLAW).

The pitch attitude may need to be transiently limited to prevent stall. If the aircraft nose swings up or down too steeply, this could cause a stall on the aircraft. This pitch angle may be referred to herein as theta (θ). The first order time derivative of θ may be referred to as $\dot{\theta}$. $\dot{\theta}$ is pitch rate, q, in level flight, and there is a mathematical relationship between pitch rate and loading on the aircraft. The aircraft may have a specified load factor limit, and it may therefore also be necessary to transiently limit $\dot{\theta}$ to keep the aircraft within its load factor. This may include modifying the outer loop $\dot{\theta}$ and speed commands while in transition, or in wing-borne flight.

Some existing systems use a fly-by-wire control system including a "g command" or pitch-rate command system. In these systems, the load factor can be limited directly by limiting the maximum pilot load factor or $\dot{\theta}$ command. For pitch-rate command systems, the command types may switch to a g command when near the load limit. Alternatively, the maximum pitch rate may be scaled to limit the maximum effective command load factor.

On some aircraft without a fly-by-wire control system, the autopilot may disconnect at limits. Additionally, a bob-weight may be added to make the pilot stick force high (e.g., 50 lbs or so) when at the load limit.

Angle of attack (AOA) limiters may act on the pilot's longitudinal stick command. For example, an AOA limiter when active switches the stick from g command to direct alpha (α) command. An α limiter function may limit the maximum g command as a function of AOA. In a non-fly-by-wire system, a stick pusher can limit α.

The present specification provides a system and method, including a flight control computer, that receives a pilot input and implements a second order transfer function. This second order transfer function includes an outer loop with a stall protection circuit that provides a limit on θ for angle of attack protection. It also includes an inner loop with a load protection circuit, which provides a limit on $\dot{\theta}$ for load factor protection. When the pilot or the autopilot provides a flight control input, this second order transfer function computes a θ command (i.e., a pitch attitude angle), a $\dot{\theta}$ command (i.e., a pitch acceleration), and in some examples, a $\ddot{\theta}$ command, being a second order time derivative of the pitch attitude. These are then translated into displacements of control surfaces to provide the desired movements. The limiter circuits provide limits on θ and $\dot{\theta}$ to prevent stall and overload, respectively.

The system disclosed herein provides a flight control computer with a nested loop configuration. The flight control computer accepts an attitude or pitch command, and mixes that command with desirable dynamics.

The flight control computer includes an outer loop that provides a saturation of the θ command input, which limits the angle of attack. The controller also provides a saturation on $\dot{\theta}$ (the pitch rate), which provides protection from an overload via pitch acceleration.

With either of these inputs saturated, further input commands on the saturated input provide no additional displacement in that dimension. Advantageously, the flight control computer does not need to provide separate "modes" of operation, such as a "g command mode" or an "alpha command mode." While such modes are possible with certain embodiments, they are not necessary to provide stall protection and load factor protection.

The foregoing can be used to build or embody several example implementations, according to the teachings of the present specification. Some example implementations are included here as non-limiting illustrations of these teachings.

There is disclosed an example inner loop controller for an aircraft flight computer, comprising: a stall protection circuit to compute, for an attitude angle θ, an attitude limit $\theta_{max}$ as a function of a flight path angle (γ) and an angle of attack limit ($\alpha_{max}$); a transfer function circuit to convert θ to an attitude rate $\dot{\theta}$, wherein $\dot{\theta}$ is a time derivative of θ; and a load protector circuit to compute a limit on $\dot{\theta}$ ($\dot{\theta}_{max}$) as a function of a load factor limit ($N_{z,max}$) and a true airspeed (v).

There is further disclosed an example inner loop controller, wherein the transfer function is a second-order transfer function.

There is further disclosed an example inner loop controller, wherein the load protector circuit is to further compute $\dot{\theta}_{max}$ as a function of a roll angle φ.

There is further disclosed an example inner loop controller, wherein the stall protection circuit is to determine that an angle of attack limiting mode is inactive, and apply a static $\theta_{limit}$.

There is further disclosed an example inner loop controller, wherein the stall protection circuit is to determine that an angle of attack limiting mode is inactive, and to compute $\theta_{limit}$ as a function of angle of attack.

There is further disclosed an example inner loop controller, wherein $\dot{\theta}_{max}$ is a function of a roll angle when wings are not level.

There is further disclosed an example inner loop controller, further comprising a pitch acceleration circuit to compute a second-order time derivative of $\theta$ ($\ddot{\theta}_{max}$).

There is further disclosed an example flight control computer, comprising the inner loop controller of a number of the above examples.

There is further disclosed an example nested loop flight control computer, comprising the inner loop controller of a number of the above examples, an outer loop controller, and an actuator interface to drive flight control surface actuators.

There is further disclosed an example of a nested loop flight control computer, wherein the computer is to provide a rate command mode.

There is further disclosed an example aircraft comprising an autopilot system, and a flight control computer as discussed above.

There is further disclosed an example autonomous or semi-autonomous aircraft comprising a flight control computer as discussed above.

There is further disclosed an example fixed-wing aircraft comprising a flight control computer as discussed above.

There is further disclosed an example rotary air taxi comprising a flight control computer as discussed above.

There is further disclosed an example quadcopter aircraft comprising a flight control computer as discussed above.

There is further disclosed an example quadcopter aircraft, wherein the quadcopter is a tiltrotor.

There is further disclosed an example aircraft comprising an augmented flight control system comprising a flight control computer as discussed above.

There is also disclosed an example method of providing aircraft control, comprising: computing, for an attitude angle $\theta$, a stall protection limit $\theta_{max}$; applying a time derivative to $\theta$ to compute a pitch rate $\dot{\theta}$; calculating a limit for $\dot{\theta}$ ($\dot{\theta}_{max}$); and applying $\theta_{max}$ and $\dot{\theta}_{max}$ to a flight control input.

There is further disclosed an example method, wherein $\theta_{max}$ is a function of a flight path angle ($\gamma$) and an angle of attack limit ($\alpha_{max}$).

There is further disclosed an example method, wherein $\dot{\theta}_{max}$ is a function of a load factor limit ($N_{z,max}$) and a true airspeed ($v$).

There is further disclosed an example method, wherein applying the time derivative comprises computing a second-order the transfer function.

There is further disclosed an example method, further comprising computing $\dot{\theta}_{max}$ as a function of a roll angle $\varphi$.

There is further disclosed an example method, further comprising determining that an angle of attack limiting mode is inactive, and applying a static $\theta_{limit}$.

There is further disclosed an example method, further comprising determining that an angle of attack limiting mode is inactive, and computing $\theta_{limit}$ as a function of angle of attack.

There is further disclosed an example method, wherein $\dot{\theta}_{max}$ is a function of a roll angle when wings are not level.

There is further disclosed an example method, further comprising computing a second-order time derivative of $\theta$ ($\ddot{\theta}$).

There is further disclosed an example flight control computer, comprising an inner loop controller, to perform the method of a number of the above examples.

There is further disclosed an example nested loop flight control computer, comprising an inner loop controller as discussed above, an outer loop controller, and an actuator interface to drive flight control surface actuators.

There is further disclosed an example nested loop flight control computer, wherein the computer is to provide a rate command mode.

There is further disclosed an example aircraft comprising an autopilot system, and a flight control computer as discussed above.

There is further disclosed an example autonomous or semi-autonomous aircraft comprising a flight control computer as discussed above.

There is further disclosed an example fixed-wing aircraft comprising a flight control computer as discussed above.

There is further disclosed an example rotary air taxi comprising a flight control computer as discussed above.

There is further disclosed an example quadcopter aircraft comprising a flight control computer as discussed above.

There is further disclosed an example quadcopter aircraft, wherein the quadcopter is a tiltrotor.

There is further disclosed an example aircraft comprising an augmented flight control system comprising a flight control computer as discussed above.

There is also disclosed an example aircraft, comprising: an airframe; flight control surfaces; actuators to drive the flight control surfaces; flight control input means; and a nested loop flight control computer, comprising an outer loop, an inner loop, and an actuator control loop, wherein the actuator control loop comprises circuitry to compute actuator, the outer loop comprises circuitry to provide altitude and acceleration, and the inner loop comprises attitude control circuitry programmed to: receive a pitch command from the input means; compute a maximum pitch angle as a function of a flight path angle and an angle of attack limit; and compute a maximum pitch rate as a function of a load factor limit and an airspeed.

There is further disclosed an example aircraft, wherein computing the pitch rate comprises computing a second-order transfer function based on the pitch angle.

There is further disclosed an example aircraft, wherein the flight control computer is to further compute a limit on the pitch rate as a function of a roll angle.

There is further disclosed an example aircraft, wherein the flight control computer is to determine that an angle of attack limiting mode is inactive, and apply a static pitch angle limit.

There is further disclosed an example aircraft, wherein the flight control computer is to determine that an angle of attack limiting mode is inactive, and to compute a maximum pitch angle as a function of angle of attack.

There is further disclosed an example aircraft, wherein the maximum pitch rate is a function of a roll angle when wings are not level.

There is further disclosed an example aircraft, wherein the flight control computer further comprises a pitch acceleration circuit to compute a second-order time derivative of a pitch angle.

There is further disclosed an example aircraft, wherein the flight control computer is to provide a rate command mode.

There is further disclosed an example aircraft, further comprising an autopilot system.

There is further disclosed an example aircraft, wherein the aircraft is an autonomous or semi-autonomous aircraft.

There is further disclosed an example aircraft, wherein the aircraft is a fixed-wing aircraft comprising a flight control computer as discussed above.

There is further disclosed an example aircraft, wherein the aircraft is a rotary air taxi.

There is further disclosed an example aircraft, wherein the aircraft is a quadcopter aircraft.

There is further disclosed an example quadcopter aircraft, wherein the quadcopter is a tiltrotor.

There is further disclosed an example aircraft, further comprising an augmented flight control system.

A system and method for providing intelligent aircraft and rotorcraft load factor and stall protection will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

Figure 2:
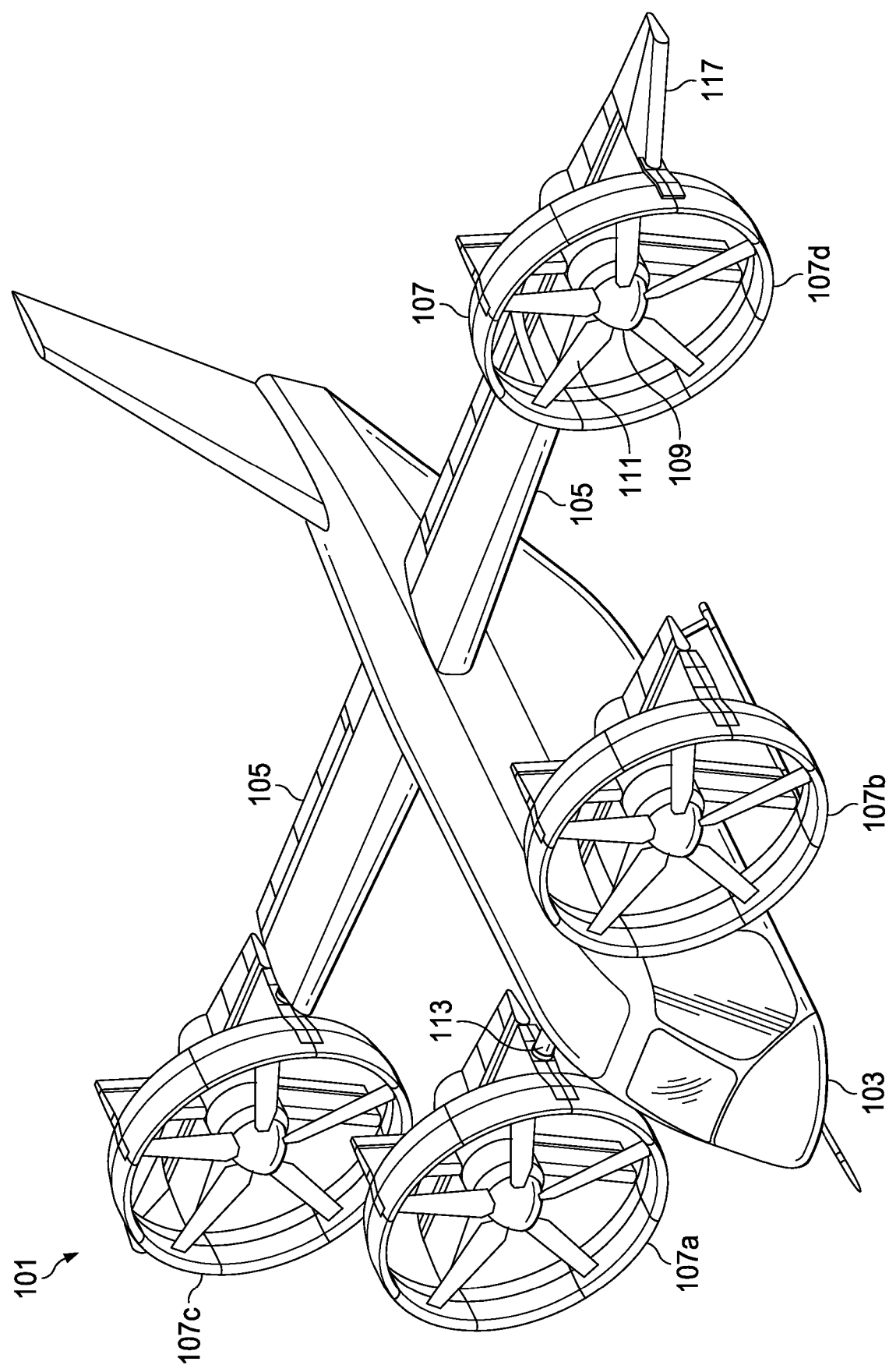
FIG. 2 is an oblique view the aircraft depicted in FIG. 1, with the ducted rotors configured for the aircraft to operate in an airplane mode.

FIGS. 1 and 2 are oblique views of a ducted-rotor aircraft 101. Aircraft 101 comprises a fuselage 103 with a fixed wing 105 that extends therefrom and a plurality of rotatable ducts 107. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in helicopter mode, which allows for vertical takeoff and landing, hovering, and low-speed directional movement. As shown in FIG. 2, ducts 107 are positioned such that aircraft 101 is in airplane mode, which allows for high-speed forward-flight.

Figure 3:
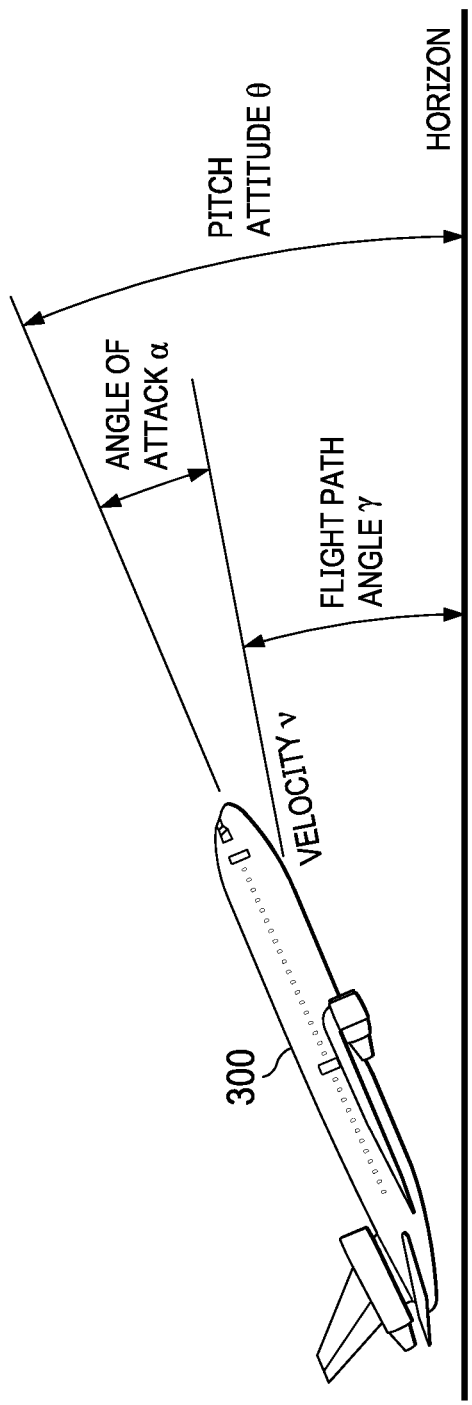
FIG. 3 is a schematic illustrating the relationship between various parameters for an aircraft.

In this embodiment, aircraft 101 is configured with four ducts 107, including two ducts 107a and 107b that form a forward pair of ducts and two ducts 107c and 107d that form an aft pair of ducts. Each duct 107 is rotatably coupled to fuselage 103 of aircraft 101 via a spindle. Ducts 107a and 107b are coupled directly to fuselage 103 by a first spindle 113. Ducts 107c and 107d are each independently coupled to a corresponding end of wing 105 via a respective spindle 115 (e.g., as seen in FIG. 3). As shown, ducts 107c and 107d each include a winglet 117 that is coupled thereto. It should be appreciated that aircraft 101 is not limited to the illustrated configuration having four ducts 107, and that aircraft 101 may alternatively be implemented with more or fewer ducts 107. Furthermore, it should be appreciated that the teachings of the present specification may be applicable to other types of aircraft, including traditional helicopters, military helicopters such as attack helicopters, and fixed-wing aircraft, by way of example.

In an illustrative use case, aircraft 101 could be an "air taxi," which provides for example short point-to-point flights for customers. When operating as an air taxi, aircraft 101 could be piloted or unpiloted. For example, aircraft 101 could be an unmanned aerial vehicle (UAV) that provides air taxi service. In cases where aircraft 101 is piloted, the flight controls may be highly augmented, for example in a "fly by wire" configuration. In some cases, instead of a traditional stick, collective, and pedals, aircraft 101 could provide an inceptor, which simplifies pilot control, and leaves many of the more detailed flight commands to a flight control computer. Furthermore, in cases where aircraft 101 is piloted, it may also provide an autopilot mode, wherein for certain legs of a flight, a flight path is programmed and the aircraft acts autonomously for the duration of that flight path until the leg is finished, or the pilot overrides the autopilot.

FIG. 3 is a schematic illustrating the relationship between various parameters for an aircraft 300. Aircraft 300 may be a rotary aircraft, a fixed-wing aircraft, or other aircraft. The relationships illustrated in FIG. 3 are those generally used and understood in the industry. In this case, velocity is labeled as v, and is a vector. However, in some of the calculations disclosed below, a scalar velocity is used, and is called "airspeed v".

There is also disclosed a pitch attitude $\theta$, which is the angle between the nose of the aircraft and the horizon. The flight path angle $\gamma$ is the angle between the horizon and the actual flight path of aircraft 300. AOA $\alpha$ is the difference between pitch attitude $\theta$ and flight path angle $\gamma$.

Figure 4A:
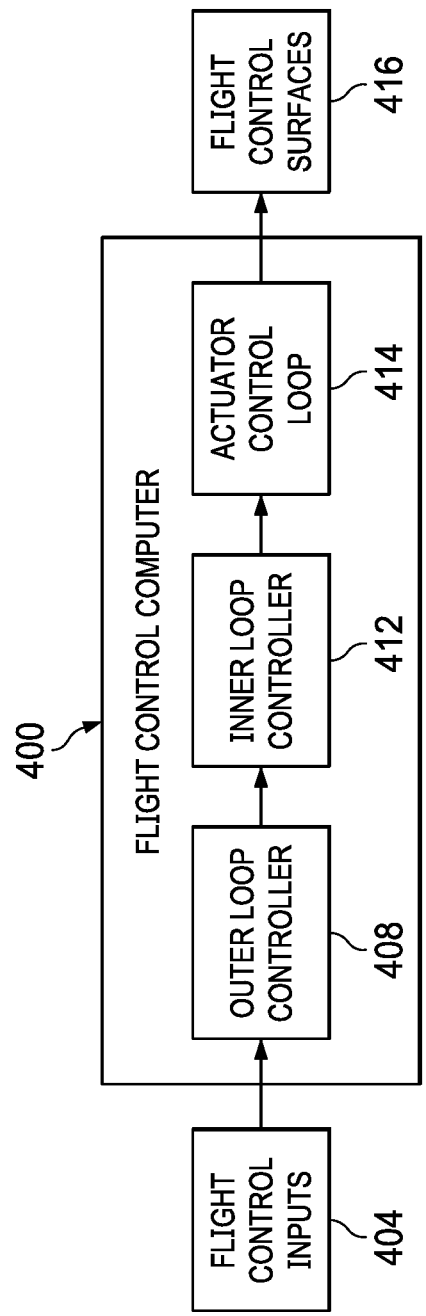
FIG. 4A is a block diagram illustrating selected portions of a flight control computer.

FIG. 4A is a block diagram illustrating selected portions of a flight control computer 400. Flight control computer 400 may be implemented in various types of circuitry, including in analog circuitry, digital or programmable circuitry, and/or mixed-signal circuitry. In the case of a programmable circuit (e.g., a digital signal processor (DSP) or central processor unit (CPU), the "circuit" is considered to be both the physical circuitry, as well as the instructions that program the circuit to perform a particular function. These instructions may be stored in volatile and/or nonvolatile memory, such as a main memory, read-only memory (ROM), hard drive, optical drive, or other storage medium.

Flight control computer 400 particularly illustrates the input conditioning of an inner loop controller 412.

Outer loop controller 408 receives from flight control inputs a value such as a stick position, throttle positions, or similar. Outer loop controller 408 in this example provides speed and/or altitude control.

Figure 4B:
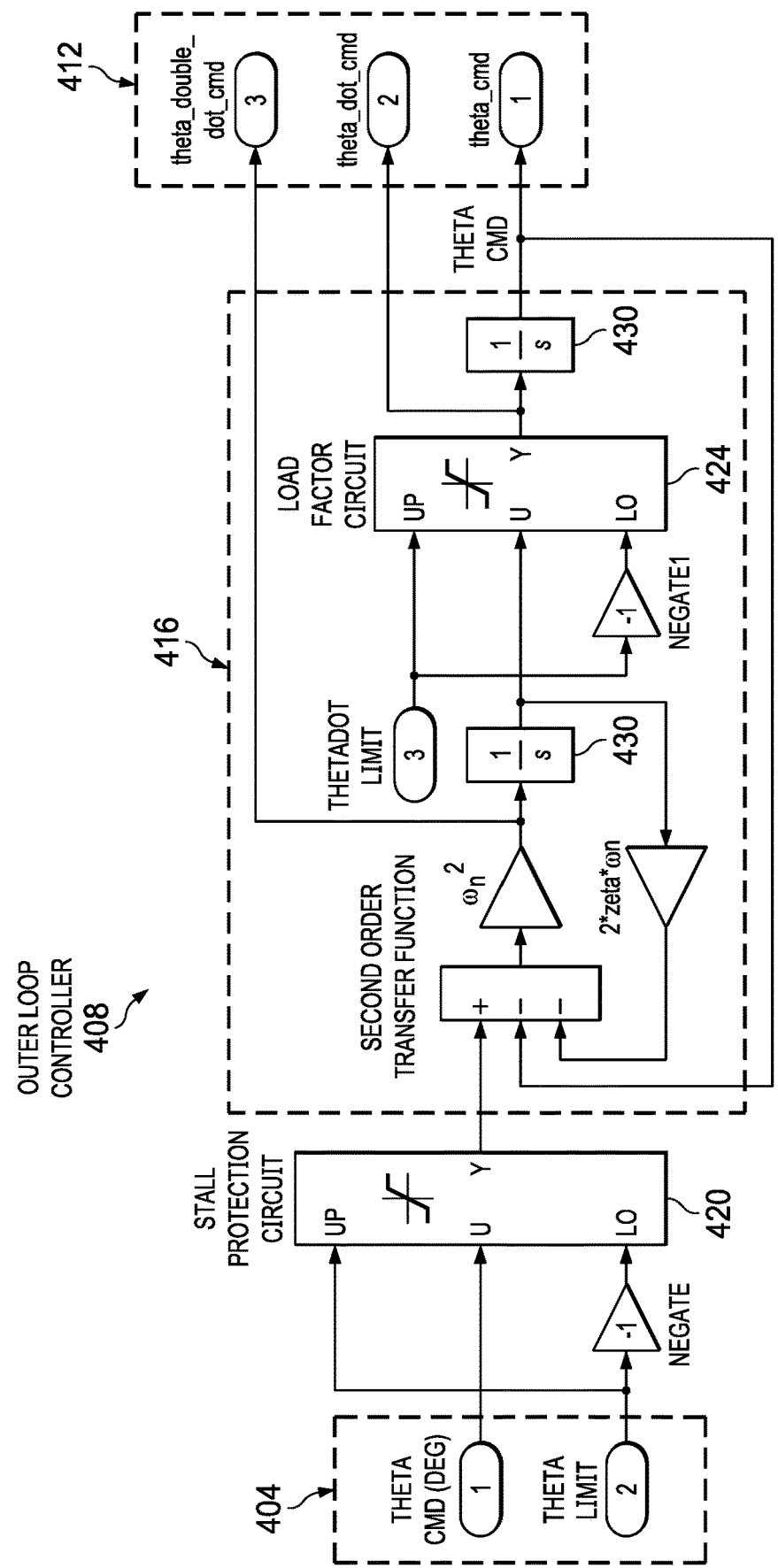
FIG. 4B is a block diagram illustrating an embodiment in which an inner control loop receives flight control inputs.

Turning to FIG. 4B, inner control loop 412 receives from the flight control inputs a $\theta$ command 1, $\theta$ limit 2, and $\dot{\theta}$ limit 3. Outer loop controller 408 provides as outputs a $\theta$ command 1, a $\dot{\theta}$ command 2, and a $\ddot{\theta}$ command 3. These are provided to inner loop controller 412.

Actuator control loop 414 receives conditioned displacement commands from outer loop 408 and inner loop 412, and translates these into displacements of actuators that operate control surfaces.

Outer loop controller 408 includes a stall protection circuit 420. Stall protection circuit 420 provides theta limiting, according to a $\theta$ limit algorithm. Aspects of these are disclosed in FIGS. 4B, 5, 6, and 7, below.

A second order transfer function 416 provides integration, according to a natural frequency ($wn_2$) of the system.

The output of second order transfer function 416 is provided to load factor circuit 424, along with a $\dot{\theta}$ limit input 3.

Load factor circuit 424 calculates a $\dot{\theta}$ limit, according to an algorithm. Examples of aspects of such an algorithm are disclosed in FIGS. 5, 6, and 7, below.

Step controllers 430 are also provided to control a delay to a step input. Step controllers 430 help to ensure that the response to a control input has a slight delay, so as to avoid a control response that would feel sudden or choppy to a human operator.

Outer loop controller 408 prevents the aircraft from exceeding a load factor limit using a relationship between $N_z$, pitch rate, true airspeed, and flight path angle to determine a maximum allowable pitch rate. The maximum allowable pitch rate may be converted to $\dot{\theta}$, and the rate limit is enforced on the attitude command.

An AOA limiter may also use kinematic relationships between the flight path angle, $\alpha$, and pitch attitude to dynamically limit the pitch attitude command. An anticipation term based on an estimated $\dot{\alpha}$ modifies the pitch attitude limit engagement point to prevent overshoot of the maximum $\alpha$.

This provides protection against stall and limit load exceedances for a $\theta$ command system. Advantageously, this only transiently affects the pitch attitude response. The AOA limiter works with sensed, estimated, and inertial AOA.

Figure 5:
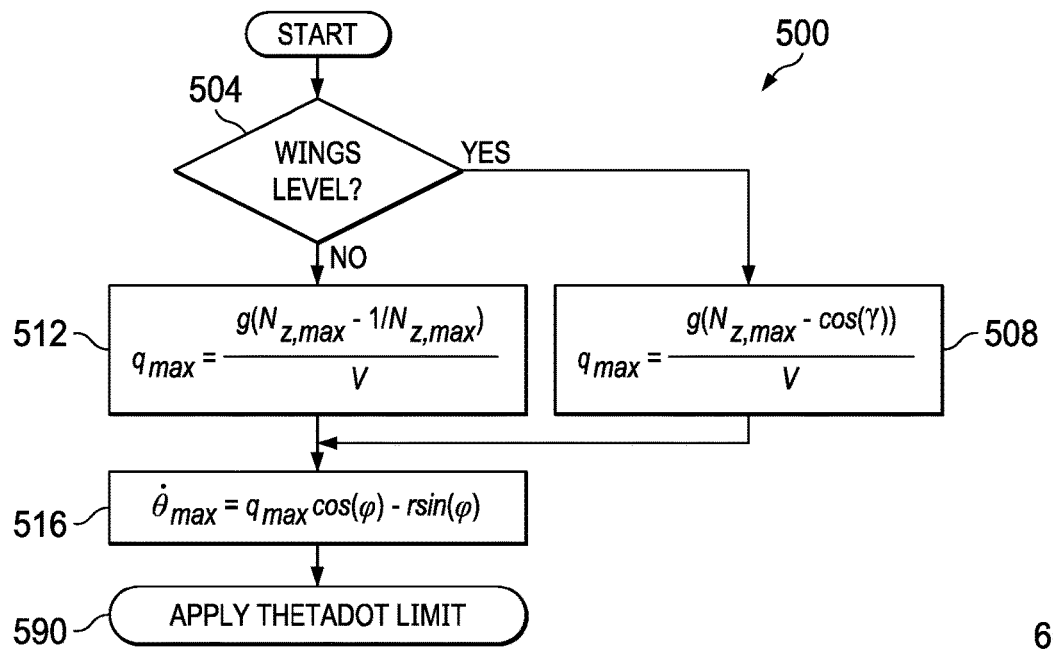
FIG. 5 is a flowchart that illustrates a method of computing $\dot{\theta}_{max}$.

FIG. 5 is a flowchart that illustrates a method of computing $\dot{\theta}_{max}$. This may be used, for example, within load factor circuit 424 of FIG. 4, or in other appropriate computing elements.

In decision block 504, the system determines whether the wings are level. In particular, this may include whether the wings are level on the roll axis. It is anticipated in a pitch command mode that the wings are not level on a pitch axis.

If the wings are level, then in block 508, the value $q_{max}$ is calculated as:

$$q_{max} = \frac{g(N_{z,max} - \cos(\gamma))}{v}$$

If the wings are not level, then in block 512, $q_{max}$ is calculated as:

$$q_{max} = \frac{g(N_{z,max} - 1/N_{Z,max})}{v}$$

The value of $\dot{\theta}_{max}$ can then be computed as:

$$\dot{\theta}_{max} = q_{max}{}^{\cos(\varphi)-r\,\sin(\varphi)}$$

In block 590, the system applies the $\dot{\theta}$ limit, as illustrated, for example, in FIG. 4.

Figure 6:
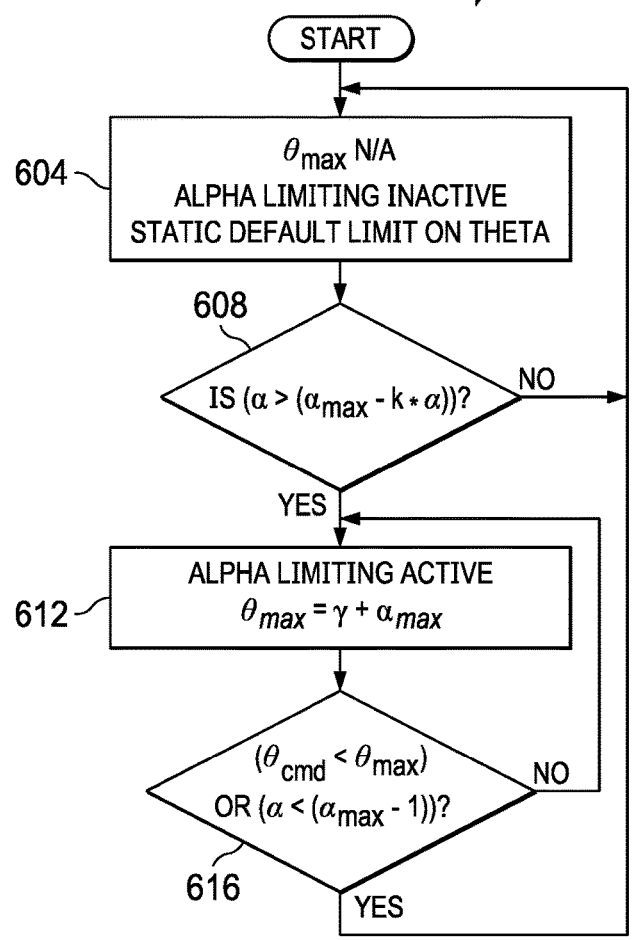
FIG. 6 is a flowchart of a method.

FIG. 6 is a flowchart of a method 600. Method 600 provides alpha limiting.

In block 604, the initial condition is that $\theta_{max}$ is not applicable. In this case, alpha limiting is inactive. When alpha limiting is inactive, a static default limit on $\theta$ ($\theta_{max}$) will be applied. This static default value may be determined empirically or via modeling for a particular aircraft.

In decision block 608, the system determines whether $\alpha > (\alpha_{max} - k^*\dot{\alpha})$. If $\alpha$ is not greater than this difference, then control returns to block 604, and the static $\theta_{max}$ is used.

Returning to decision block 608, if $\alpha$ is greater than the stated difference, then in block 612, $\alpha$ limiting is active. In that case, $\theta_{max}$ is computed as:

$$\theta_{max} = \gamma + \alpha_{max}$$

In decision block 616, the system determines whether the $\theta$ command is less than $\theta_{max}$, or whether the $\alpha$ is less than $\alpha_{max} - 1$. If it is not, then control returns back to block 612, and $\alpha$ limiting continues to be enforced. If one of these applies, then control returns back to block 604, and $\theta_{max}$ is applied.

Figure 7:
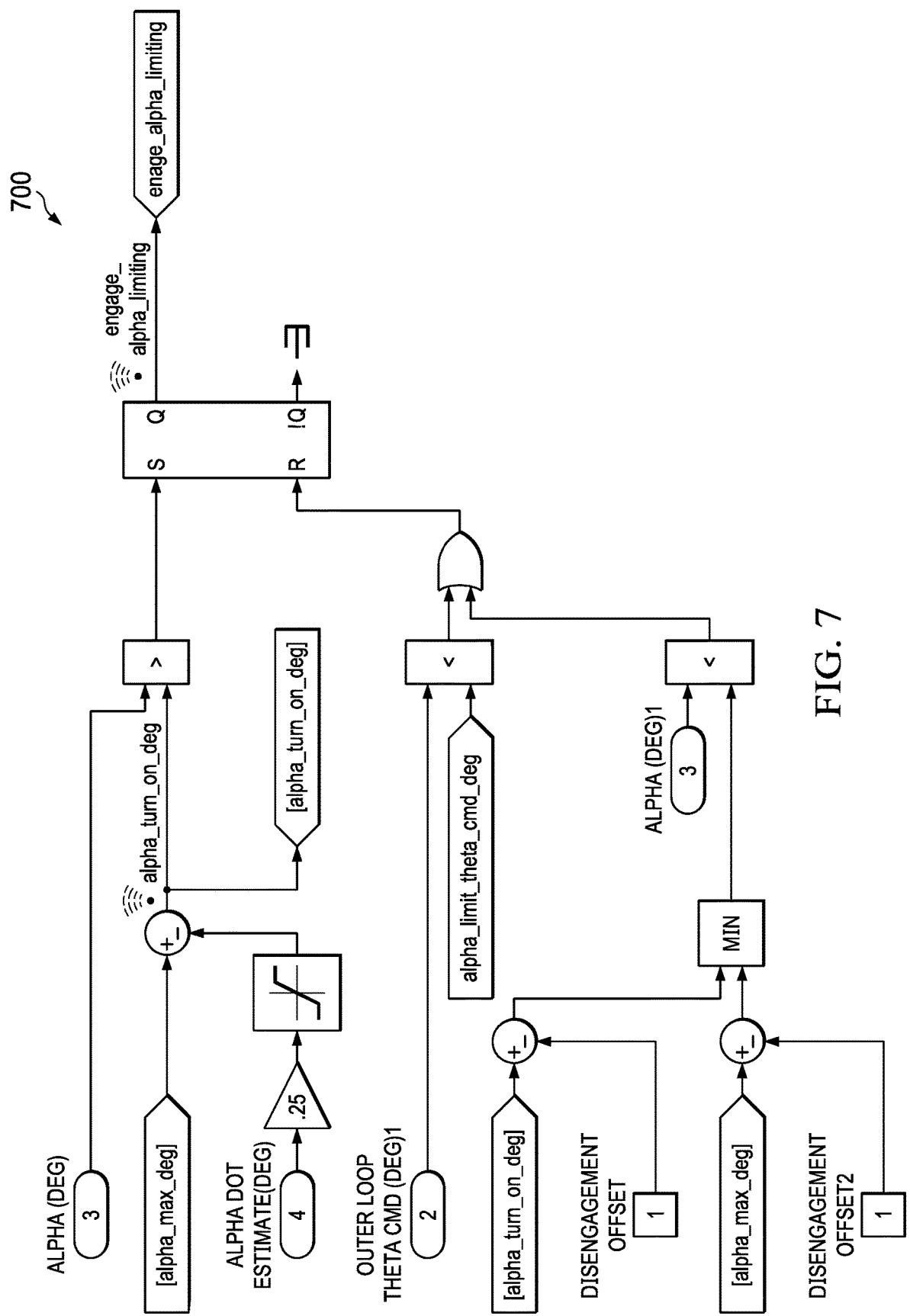
FIG. 7 is a flow diagram of a control system.

FIG. 7 is a flow diagram of a control system 700, illustrating an embodiment of the method of FIG. 6. Diagram 700 illustrates the computation of $\dot{\theta}_{max}$.

Control system 700 receives $\alpha$, $\alpha_{max}$, and an $\dot{\alpha}$ estimate in degrees, an outer loop $\theta$ command, an $\alpha$ limit $\theta$ command in degrees, an $\alpha$ turn-on threshold in degrees, a disengagement offset, an $\alpha_{max}$ in degrees, and a disengagement offset 2 as inputs. Using these inputs, the control system determines whether to engage $\alpha$ limiting, and outputs a signal of whether $\alpha$ limiting is engaged. This control system also computes $\theta_{max}$ according to $\theta_{max} = \gamma + \alpha_{max}$.

In some systems, there may be a need for longitudinal envelope protection for a nested model following CLAW. In this case, a load factor limit $\dot{\theta}_{max}$ can be computed. The steady state pull-up max pitch rate can be computed as:

$$q_{max} = \frac{g(N_{z,max} - \cos(\gamma))}{v}$$

The steady turn max pitch rate can be computed as:

$$q_{max} = \frac{g(N_{z,max} - 1/N_{Z,max})}{v}$$

The minimum of the two pitch rates can then be used in the $\dot{\theta}_{max}$ calculation. In this case:

$$\dot{\theta}_{max} = q_{max}{}^{\cos(\varphi)-r\,\sin(\varphi)}$$

Diagram 700 illustrates an AOA $\theta$ limit method. This provides activation logic to prevent unnecessary limiting. When activated, the outer loop $\theta$ command is overridden by $\theta_{max}$. $\theta_{max}$ is computed as $\theta_{max} = \gamma + \alpha_{max}$.

Figure 8:
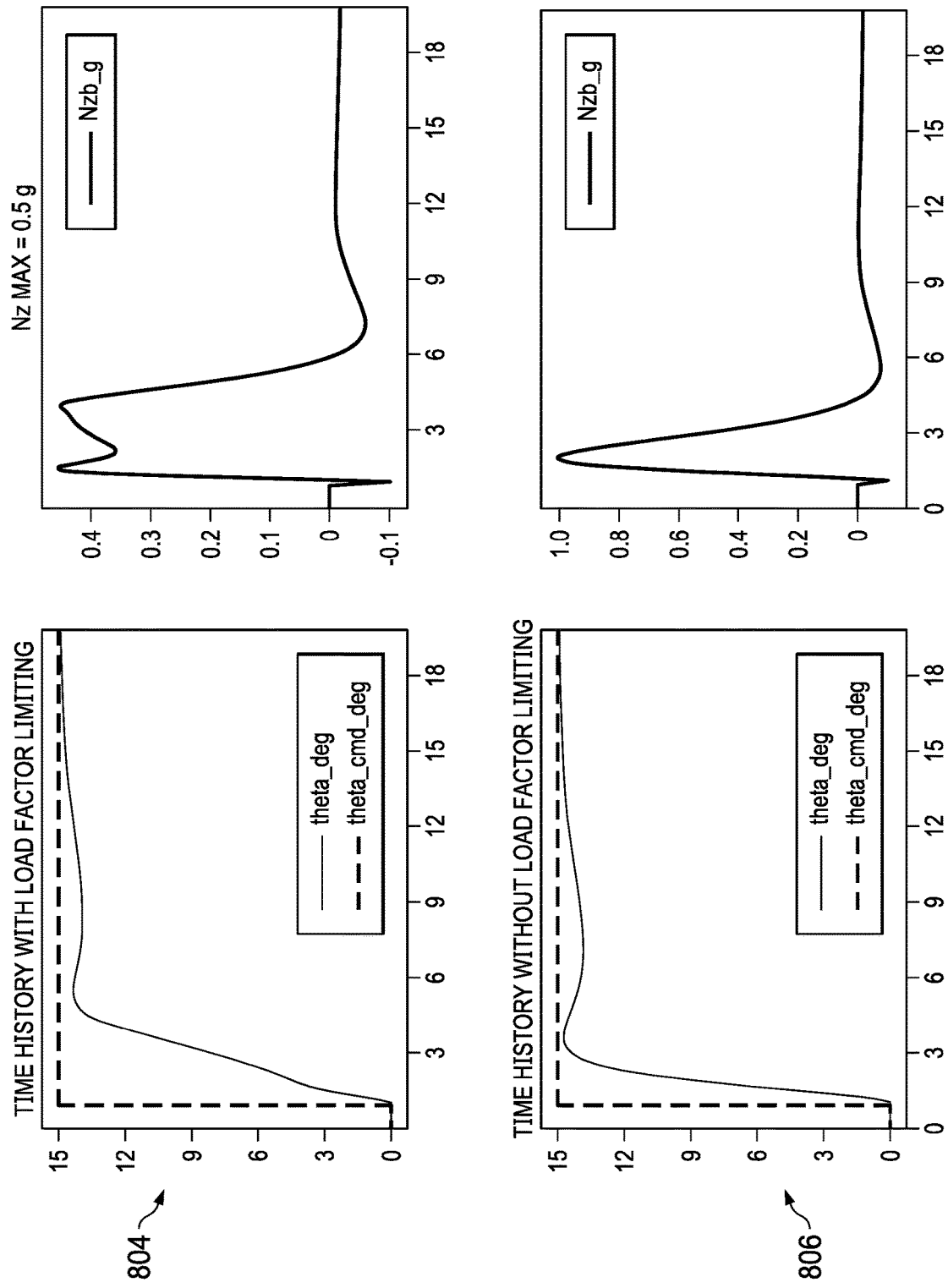
FIG. 8 is a series of graphs illustrating response of systems according to the present specification.

FIG. 8 is a series of graphs illustrating response of systems according to the present specification. In this case, $N_{Z,max}$ is 0.5 g. Graph 804 illustrates a time domain control history with load factor limiting. Graph 806 illustrates a time domain history without load factor limiting. In Graphs 804 and 806 an aggressive pitch up maneuver is commanded. In Graph 806 without the load factor limiter, the maximum load factor reaches 1.0 g, while in Graph 804 the load factor limiter prevents exceedance of the 0.5 g limit.

Figure 9:
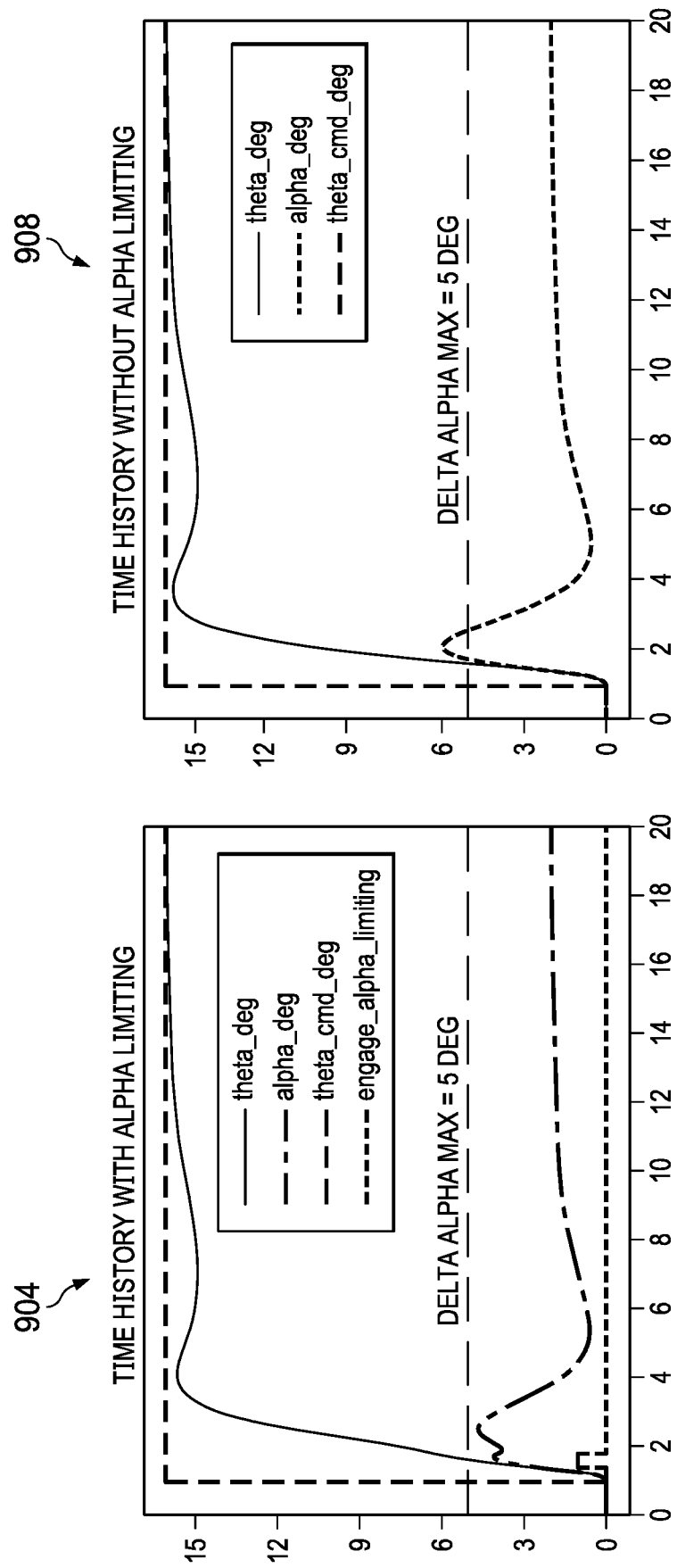
FIG. 9 is a series of graphs illustrating time domain response.

FIG. 9 is a series of graphs illustrating time domain response. Graph 904 illustrates a time domain response with $\alpha$ limiting. Graph 908 illustrates a time domain graph without $\alpha$ limiting. In Graphs 904 and 906 an aggressive pitch up maneuver is commanded. In Graph 908 without the alpha limiter, the maximum alpha reaches 6 degrees, while in Graph 904 the alpha limiter prevents exceedance of the 5-degree limit.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, et cetera; greater than 0.10 includes 0.11, 0.12, 0.13, et cetera). For example, whenever a numerical range with a lower limit, $R_l$, and an upper limit, $R_u$, is disclosed, any number falling within the range is specifically disclosed. In particular, the following numbers within the range are specifically disclosed: $R = R_l + k^*(R_u - R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. Also, the phrases "at least one of A, B, and C" and "A and/or B and/or C" should each be interpreted to include only A, only B, only C, or any combination of A, B, and C.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment," "example embodiment," "an embodiment," "another embodiment," "certain embodiments," "some embodiments," "various embodiments," "other embodiments," "alternative embodiment," and the like are intended to mean that any such features are included in one or more embodiments of the present disclosure, but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z," "at least one of X, Y or Z," "one or more of X, Y and Z," "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A nested loop flight control computer for an aircraft, comprising:
    a stall protection circuit to compute, for an attitude angle $\theta$, an attitude limit $\theta_{max}$ as a function of a flight path angle ($\gamma$) and an angle of attack limit ($\alpha_{max}$), wherein $\theta_{max} = \gamma + \alpha_{max}$;
    a transfer function circuit to convert $\theta$ to an attitude rate $\dot{\theta}$, wherein $\dot{\theta}$ is a time derivative of $\theta$; and
    a load protector circuit to compute a limit on $\dot{\theta}$ ($\dot{\theta}_{max}$) as a function of a load factor limit ($N_{z,max}$), gravity (g), roll attitude ($\phi$), and a true airspeed (v), wherein maximum pitch rate ($q_{max}$) is the lesser of $g(N_{z,max} - \cos(\gamma))/v$ and $g(N_{z,max} - 1/Z_{z,max})/v$ and $\dot{\theta}_{max} = q_{max}^{cos(\phi) - r sin(\phi)}$, wherein r is body yaw rate; and
    an actuator interface, wherein the actuator interface controls a position of flight control surface actuators according to conditioned commands from an inner loop control circuit and an outer loop control circuit of the nested loop flight control computer 2. The nested loop flight control computer of claim 1, wherein a transfer function implemented by the transfer function circuit is a second-order transfer function.

3. The nested loop flight controller of claim 1, wherein the stall protection circuit is to determine that an angle of attack limiting mode is inactive, and apply a static $\theta_{limit}$.

4. The nested loop flight controller of claim 1, wherein the stall protection circuit is to determine that an angle of attack limiting mode is inactive, and to compute $\theta_{limit}$ as a function of angle of attack.

5. The nested loop flight controller of claim 1, wherein $\dot{\theta}_{max}$ is a function of a roll angle when wings are not level.

6. The nested loop flight controller of claim 1, further comprising a pitch acceleration circuit to compute a second-order time derivative of $\theta$ ($\ddot{\theta}$).

7. The nested loop flight control computer of claim 1, wherein the computer is to provide a rate command mode.

8. A method of providing aircraft control, comprising:
computing, for an attitude angle $\theta$, a stall protection limit $\theta_{max}$ as a function of a flight path angle ($\gamma$) and an angle of attack limit ($\alpha_{max}$), wherein $\theta_{max} = \gamma + \alpha_{max}$;
applying a time derivative to $\theta$ to compute a pitch rate $\dot{\theta}$;
calculating a limit for $\dot{\theta}$ ($\dot{\theta}_{max}$) as a function of a load factor limit ($N_{z,max}$), gravity (g), roll attitude ($\phi$), and a true airspeed (v), wherein maximum pitch rate ($q_{max}$) is the lesser of $g(N_{z,max} - \cos(\gamma))/v$ and $g(N_{z,max} - 1/N_{z,max})/v$ and $\dot{\theta}_{max} = q_{max}^{\cos(\phi) - r\sin(\phi)}$, wherein r is body yaw rate; and
applying $\theta_{max}$ and $\dot{\theta}_{max}$ to a flight control input to control a position of flight control surface actuators.

9. The method of claim 8, wherein applying the time derivative comprises computing a second-order the transfer function.

10. The method of claim 8, further comprising computing $\dot{\theta}_{max}$ as a function of a roll angle $\phi$.

11. An aircraft, comprising:
an airframe;
flight control surfaces;
actuators to drive the flight control surfaces;
flight control input means; and
a nested loop flight control computer, comprising an outer loop, an inner loop, and an actuator control loop, wherein the actuator control loop comprises circuitry to compute actuator displacements, the outer loop comprises circuitry to provide altitude and acceleration, and the inner loop comprises attitude control circuitry programmed to:
receive a pitch command from the input means;
compute a maximum pitch angle ($\theta_{max}$) as a function of a flight path angle ($\gamma$) and an angle of attack limit ($\alpha_{max}$), wherein $\theta_{max} = \gamma + \alpha_{max}$; and
compute a maximum pitch rate ($\dot{\theta}_{max}$) as a function of a load factor limit ($N_{z,max}$), gravity (g), roll attitude ($\phi$), and a true airspeed (v), wherein maximum pitch rate ($q_{max}$) is the lesser of $g(N_{z,max} - \cos(\gamma))/v$ and $g(N_{z,max} - 1/N_{z,max})/v$ and $\dot{\theta}_{max} = q_{max}^{\cos(\phi) - r\sin(\phi)}$, wherein r is body yaw rate; and
an actuator interface, wherein the actuator interface controls a position of flight control surface actuators according to conditioned commands from an inner loop control circuit and an outer loop control circuit of the nested loop flight control computer.

12. The aircraft of claim 11, wherein the aircraft is a fixed-wing aircraft.

13. The aircraft of claim 11, wherein the aircraft is a rotary air taxi.

14. The aircraft of claim 11, wherein the aircraft is a quadcopter aircraft.

15. The quadcopter aircraft of claim 14, wherein the quadcopter is a tiltrotor.

* * * * *